(12) United States Patent  
Billgren et al.

(10) Patent No.: US 9,342,229 B2  
(45) Date of Patent: May 17, 2016

(54) METHOD FOR ASSOCIATING MEDIA FILES WITH ADDITIONAL CONTENT

(71) Applicant: Acast AB, Stockholm (SE)

(72) Inventors: Johan Billgren, Stockholm (SE); Mikael Emtinger, Sätila (SE); Lars Markus Ahlstrand, Älvsjö (SE)

(73) Assignee: Acast AB, Stockholm (SE)

( * ) Notice: Subject to any disclaimer, the term of this patent is extended or adjusted under 35 U.S.C. 154(b) by 0 days.

(21) Appl. No.: 14/669,765

(22) Filed: Mar. 26, 2015

(65) Prior Publication Data

US 2015/0277732 A1  Oct. 1, 2015

(30) Foreign Application Priority Data

Mar. 28, 2014 (SE) ........................................ 1450364

(51) Int. Cl.
*G06F 3/0481* (2013.01)
*G06F 3/0484* (2013.01)
(Continued)

(52) U.S. Cl.
CPC .......... *G06F 3/04847* (2013.01); *G06F 3/0481* (2013.01); *G06F 3/0488* (2013.01); *G06F 3/04842* (2013.01); *G06F 17/3005* (2013.01);
(Continued)

(58) Field of Classification Search
CPC ............ G06F 17/241; G06F 17/30038; G06F 17/3082; G06F 17/30053; H04L 65/60; H04L 29/06027; H04N 21/254
USPC .................................... 715/230, 233; 709/213
See application file for complete search history.

(56) References Cited

U.S. PATENT DOCUMENTS 6,601,103 B1 * 7/2003 Goldschmidt Iki et al. .. 709/231
8,307,392 B2   11/2012 Ahanger
(Continued)

FOREIGN PATENT DOCUMENTS

GB  2479272  10/2011
GB  2479455  10/2011
(Continued)

OTHER PUBLICATIONS

International Search Report and Written Opinion for International Application No. PCT/SE2015/050370 dated Jun. 3, 2015.
(Continued)

*Primary Examiner* — Andrew Tank
(74) *Attorney, Agent, or Firm* — Tucker Ellis LLP

(57) ABSTRACT

A method for presenting digitally stored information to a user, including providing, from a server to a client device, timeline information having first and second time points, each time point being relative to when a user accesses the timeline information, the first time point being associated with a digital audio or digital video media file, the second time point being associated with additional content, the additional content being a text or a file comprising video, audio, image, text, a webpage, user comment or user rating in a digital format. Accessing the timeline information causes the client device to start a timing procedure, the client device automatically starting playing the media file when timing reaches the first time point of the timeline information and the client device automatically presenting, to the user, the additional content when the timing reaches the second time point of the timeline information.

13 Claims, 8 Drawing Sheets

(51) Int. Cl.
*G06F 17/30* (2006.01)
*G06F 3/0488* (2013.01)

(52) U.S. Cl.
CPC .... *G06F 17/30769* (2013.01); *G06F 17/30837* (2013.01)

(56) References Cited

U.S. PATENT DOCUMENTS

| | | | |
|---|---|---|---|
| 8,595,475 B2* | 11/2013 | Hayward | 713/100 |
| 8,903,798 B2* | 12/2014 | El-Saban et al. | 707/708 |
| 2005/0144305 A1* | 6/2005 | Fegan et al. | 709/231 |
| 2006/0064716 A1 | 3/2006 | Sull et al. | |
| 2007/0233784 A1* | 10/2007 | O'Rourke | G06F 17/3002 709/203 |
| 2007/0266304 A1* | 11/2007 | Fletcher et al. | 715/500.1 |
| 2008/0065681 A1* | 3/2008 | Fontijn | G06F 17/30053 |
| 2010/0037149 A1* | 2/2010 | Heath | 715/753 |
| 2010/0251386 A1* | 9/2010 | Gilzean et al. | 726/28 |
| 2011/0246621 A1 | 10/2011 | May, Jr. et al. | |
| 2011/0252118 A1* | 10/2011 | Pantos et al. | 709/219 |
| 2012/0016965 A1 | 1/2012 | Chen et al. | |
| 2012/0167132 A1 | 6/2012 | Mathews | |
| 2012/0315009 A1* | 12/2012 | Evans et al. | 386/230 |
| 2013/0004138 A1 | 1/2013 | Kilar | |
| 2013/0159853 A1* | 6/2013 | Story et al. | 715/716 |
| 2014/0222962 A1 | 8/2014 | Mao et al. | |

FOREIGN PATENT DOCUMENTS

| | | |
|---|---|---|
| WO | 2008004236 | 1/2008 |
| WO | 2008/128084 | 10/2008 |
| WO | 2011038013 | 3/2011 |
| WO | 2013064819 | 5/2013 |

OTHER PUBLICATIONS

Communication and Extended European Search Report from corresponding European Patent Application No. 15161204.1, dated Jul. 13, 2015.

Chitu, Alex, "YouTube Annotations", Jun. 16, 2008, pp. 1-3, Retrieved from the Internet: URL:http://web.archive.org/web/200806166094332/http://googlesystem.blogspot.com/2008/06/youtube-annotations.htlm? [Retrieved on Apr. 23, 2013].

Microsoft Article 240923, So Wir's Gemacht: In PowerPoint 2002 einen Medienclip mithilfe von Windows Media Player wiedergeben, Sep. 17, 2003 and machine translation of article.

Internet Article, LiveWeb—insert and view web pages real-time, Mar. 27, 2014.

Internet Article, iSpring Converts PowerPoint Presentations to Flash Video, Jul. 1, 2008.

* cited by examiner

METHOD FOR ASSOCIATING MEDIA FILES WITH ADDITIONAL CONTENT

FIELD OF THE INVENTION

In general, this invention relates to methods and systems for providing content to an electronic client device in a computer environment.

In particular, this invention relates to a method and system for associating downloaded audio or video files, such as podcast files, with additional content such as for example additional video or audio, images, text, user comments or user ratings.

The invention also relates to a method and system for providing and displaying user generated content correlated to a time point in a social network service.

BACKGROUND

The publishing of audio or video in digital format for automatic download over the internet, has become increasingly important way of publishing audio and video content.

Different ways of adding content, in particular advertisements, to streaming media are known. US2012167132 discloses an index file for advertisements and video media. U.S. Pat. No. 8,307,392 discloses an ad insertion rule that determines when in a video an advertisement should be inserted. These documents are concerned with steaming media, i e media that can be played to the user without all of the media file having to be downloaded to a user client. However, limited bandwidth or poor coverage of wireless networks makes it difficult to stream media in certain locations. At those locations, it is preferred to download the whole media file before it is accessed by the user. Download can for example be executed by a RSS subscription service. In that context, WO2008128084 discloses how advertisements can be inserted into an audio file before delivery (i.e. download) of the file to the user. This has the disadvantage that the additional content will be inserted, at the latest, when the media is downloaded to the local device. There is no way of modifying the additional content after the user has downloaded the file to the client device.

US 2013/0004138 discloses a method for a viewer to comment a video stream. However, it would be useful to provide a method that would provide an improved experience when commenting video or audio files or live events.

These and other limitations of the prior art may be overcome by the invention disclosed herein.

SUMMARY OF THE INVENTION

In its most general form the invention relates to a method for presenting digital content to a client device, said content to be experienced by a user, the method comprising the steps of: a) providing, on a server to a client device, timeline information comprising at least one time point associated with text or a file comprising video, audio, image, text, a webpage, user comment or user rating, b) the client device accessing the timeline information, thereby causing the client device to start a timing procedure, c) the client device automatically presenting, to the user, the text or the content of the file when the timing reaches the time point of the timeline information, or alternatively, carrying out a command comprised in the text.

The timeline information is a framework for providing content from a server to a client device.

In a first aspect of the invention it is provided a method for presenting digitally stored information to a user, comprising the steps of: a) providing, from a server to a client device, timeline information comprising first and second time points, each time point being relative to when a user, through an interface provided by the client device, accesses the timeline information, the first time point being associated with a media file, the media file being a digital audio or digital video file stored on the client device, the second time point being associated with additional content, the additional content being either i) text comprised in the time line information or ii) a file stored on a server comprising image or text in a digital format, or a webpage, b) the user, through interface provided by the client device, accessing the timeline information, thereby causing the client device to start a timing procedure, c) the client device automatically starting playing the media file when timing reaches the first time point of the timeline information and d) the client device, when the timing reaches the second time point of the timeline information, automatically presenting, to the user, the additional content or presenting, to the user, an indication that additional content is available, wherein steps c) and d) can be performed in any order.

The method provides an enhanced experience to a user when listening to or watching a media file. The method allows downloaded media files, for example a MP3 file, to be associated with additional content that can be added or altered after the time point when the user has downloaded of the media file. One advantage is that such additional material can be experienced by the user even under low bandwidth conditions. Also, bandwidth can be saved for content that advantageously is updated close to the time when the user consumes it, for example user or advertisements.

Many users prefer to download media files to their mobile devices where there is access to Wi-Fi, for example in their home. One reason for this that their agreements with network providers which provides 3G and LTE network services often have a limit to the amount of data that can be downloaded. Downloading more data than the agreed amount may be very expensive. Also, mobile networks may have poor coverage and may be slow. For these reasons a user may not actually experience the media file sometime after it has been downloaded to the client device.

By using the inventive method, bandwidth will be used for additional content that is advantageously updated close to when the user experiences the media file.

An example is a user that downloads a podcast file and listens to the podcast file several days later. During those days a sponsor may decide to add an advertisement that is to be displayed to the user who listens to a podcast. By using the inventive method, bandwidth will be prioritized for the advertisement. Or users in a social network may add comments to the podcast after the time point at which the user downloads the podcast file. The inventive method will make sure that the user comments are updated at the time when the user actually listens to the podcast. Such updated material usually also requires less bandwidth than the media file which often is downloaded at home using Wi-Fi. By using the inventive method the additional content can be updated and presented to the user even when the user us using a wireless network that may sometimes have limited bandwidth, such as a 3G, 4G or a LTE network.

The additional content may be any type of content or media file. The additional content may for example be an image file stored on a server or a web page web page stored on a server. The additional content may be experienced or indicated to the user while the media file is being played. This provides an enhanced experience for the user.

When the additional content is text it may not be located on a server but may instead by provided in text format in the time line information. Thus the additional content is text comprised in the time line information. This has the advantage that the client device does not need to access a server to present the additional content. The text may for example be a user comment. The text may also comprise a link to a web page and said link is displayed as text to the user.

The additional content may have been generated by a second user using a second client device. Thereby users can comment various parts of the media file, and such comments are made available to other users, to provide an enhanced experience.

In a preferred embodiment the media file is an audio file for example a podcast, a audiobook or music. It may then be particularly useful to present additional content on the display of the device. Such additional content may for example be a user comment, an image or a web page or a link to a web page. By using the display of the device, an enhanced experience is provided to the user who experiences an audio file. For example image or web page may provide additional information about the content of the media file.

The timeline information may be updated with new time points and additional content associated thereto. In one embodiment, the time line information can be updated with additional time points associated with further additional content after step b) has been performed, ie, when the user has accessed the time line information and timing is running and typically started experiencing the media file, thereby causing the client device to present such further additional content to the user when the timing reaches the additional time point.

The inventive method allows updating in real time of additional content associated with a video or audio file, for example a podcast. Thus, the inventive method provides a information that coordinates the playing of a local media file with dynamic content that can be updated in real time.

Preferably updating of the time line information in the client device is done one the initiative of the server, i.e. a by using a push technology. The advantage of using a push technology is that the client device does not have to ask the server for updates. Pull requests to the server often results in no updates, which causes in unnecessary net traffic and waste of processing resources.

The time line information may for example be updated with an additional time point associated with further additional material, for example a user comment, which is be added to the timeline information by a second user with the use of a second client device.

This can be done by, in a first step, providing, from a second client device to a server, information about a time point relative to a time point in the media file and further additional content, then, in a second step, the server storing the information about the time point and the additional content, then in a third step, the server updating the timeline information with information about the time point and the further additional content, thereby making it available to the first client device.

The client device may offer the user, via an interface provided by the electronic client device, the possibility to add further additional content to the visual timeline, said further additional content becoming associated with an additional time point in the time line information.

Preferably, the client device has a display and the method comprises indicating on a visual timeline on the display that additional content is available.

In a second aspect of the invention it is provided a system comprising: a system comprising a processing unit and a memory unit having stored thereon instructions which, when executed by the processing unit, causes the processing unit to provide from a server to a client device, timeline information comprising first and second time points, each time point being relative to when a user, through an interface provided by the client device, accesses the timeline information, the first time point being associated with a media file, the media file being a digital audio or digital video file stored on the client device, the second time point being associated with additional content, the additional content being either i) text comprised in the time line information or ii) a file stored on a server comprising image or text in a digital format, or a webpage.

In a third aspect of the invention it is provided a method for displaying a visual timeline, the method comprising the steps of: a) providing from a server to a client device timeline information comprising at least one time point relative to when a user of the device, through interface provided by the client device, accesses the timeline information, said time point being associated with user generated content, the user generated content comprising a text, or file comprising video, audio, image, text, a webpage, user comment or user rating in a digital format, said user generated content added to the timeline information by a social networking service, b) a user, trough interface provided by client device, accessing the timeline information, thereby causing the client device to start a timing procedure, c) the client device automatically displaying a visual timeline on a display of the client device, d) the client device automatically presenting, to the user, the user generated content when the timing reaches the time point, e) automatically updating the timeline information with any additional time points associated with any further user generated content added to the timeline information by a social networking service, thereby causing the client device to present such further user generated content to the user when the timing reaches the additional time point.

In one embodiment the client device offers the user, via an interface provided by the electronic client device, the possibility to add further user generated content to the visual timeline, said further user generated content becoming associated with an additional time point in the time line information. Such user generated content will be available to other users of the social networks service.

In one embodiment, step a) is preceded by the step of a user, through client device, giving instructions to the server to create new time line information, thereby creating a new visual time line which is accessible for other users of the social network service.

In a fourth aspect of the invention it is provided a system comprising a processing unit and a memory unit having stored thereon instructions which when executed by the processing unit, cause the processing unit to: provide from a server to a client device timeline information comprising at least one time point relative to when a user, through interface provided by a client device, accesses the timeline information, said time point being associated with user generated content, the user generated content comprising a text, or file comprising video, audio, image, text, a webpage, user comment or user rating in a digital format, said user generated content added to the timeline information by a social networking service.

In a fifth aspect of the invention it is provided a method for displaying a visual timeline on the display of a client device, the method comprising the steps of: a) providing, from a server to a client device, timeline information comprising first and second time points, each time point being relative to when a user, through an interface provided by the client device, accesses the timeline information, the first time point being associated with a media file, the media file being a digital audio or digital video file stored on the client device, the second time point being associated with additional content, the additional content being either i) text comprised in the time line information or ii) a file stored on a server comprising image or text in a digital format, or a webpage, b) the user, through interface provided by the client device, accessing the timeline information, thereby causing the client device to start a timing procedure, c) the client device automatically starting playing the media file when timing reaches the first time point of the timeline information and the client device automatically displaying a visual timeline on a display of the client device, were said timeline has a visual indication regarding the presence of additional content and the location of the visual indication is decided by the second time point, and d) automatically updating the timeline information with any additional time points associated with any further additional content added to the timeline information, thereby causing the client device to indicate the presence of such further additional content on the visual timeline.

BRIEF DESCRIPTION OF DRAWINGS

The invention will now be described in more detail by means of exemplary embodiments and with reference to the accompanying drawings in which.

The format of the time point in this application is usually x.yy.zz where x is hours, yy is minutes and zz is seconds, alternatively in z seconds or yy.zz where yy is minutes and zz is seconds.

FIGS. 1-8 share reference numbers such that a specific number always indicate the same feature.

DETAILED DESCRIPTION

Figure 1:
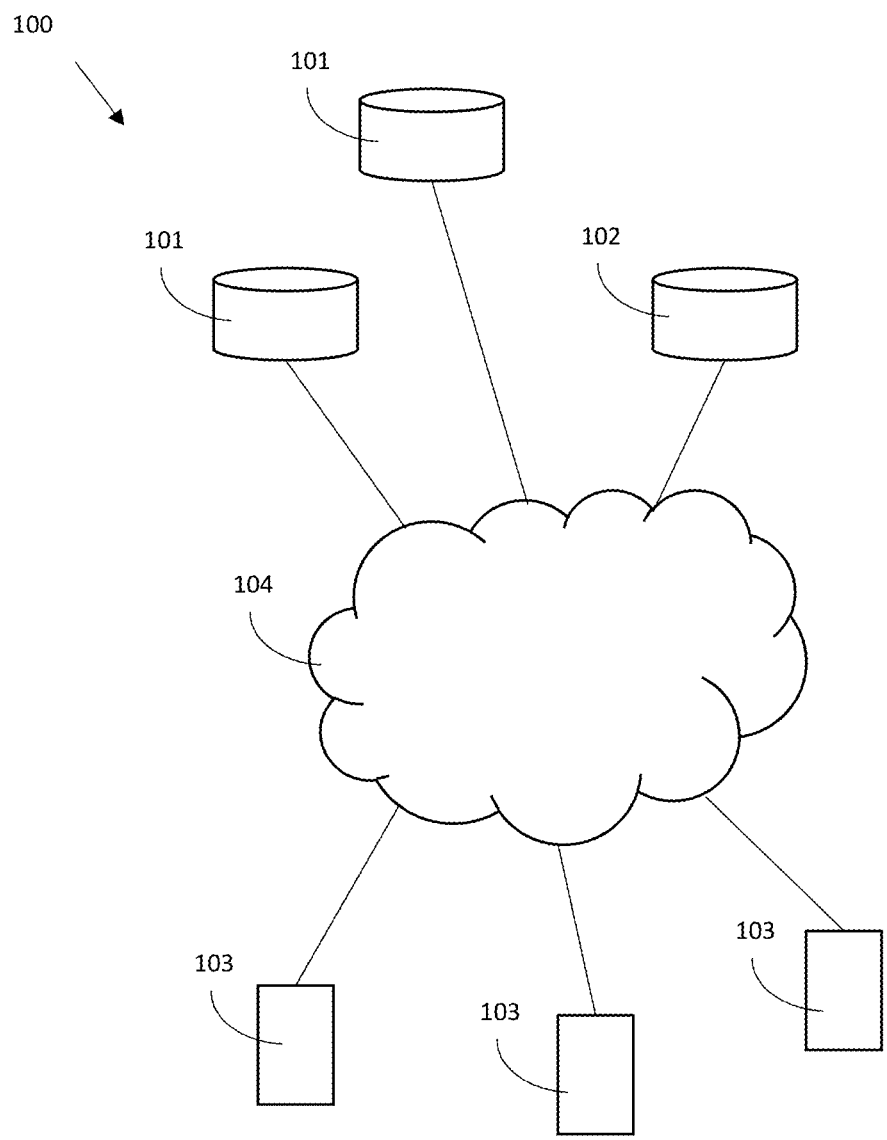
FIG. 1 is a schematic diagram illustrating an embodiment of a computing environment in which systems and methods of the invention may be carried out.

With reference to FIG. 1, in selected embodiments the features and aspects of the invention may be implemented within a computing environment 100. Such an environment may include one or more servers 101. A server may be connect to a communication network 104, preferably the internet. At least some communication in the network 104 is preferably carried out by a wireless network preferably wireless telephone networks such as a 3G, 4G, LTE or similar network. A server 101 may be connected to one or more data stores 102 through network 100. One or more client devices 103 is in communication with the server 101. The client device 103 can be, for example, a smartphone, a tablet computer or a laptop.

Client devices 103 may send and receive data and instructions to and from server 101 through the network 104. The server 101 may be a computing device with at least one memory and at least one processor.

Figure 2:
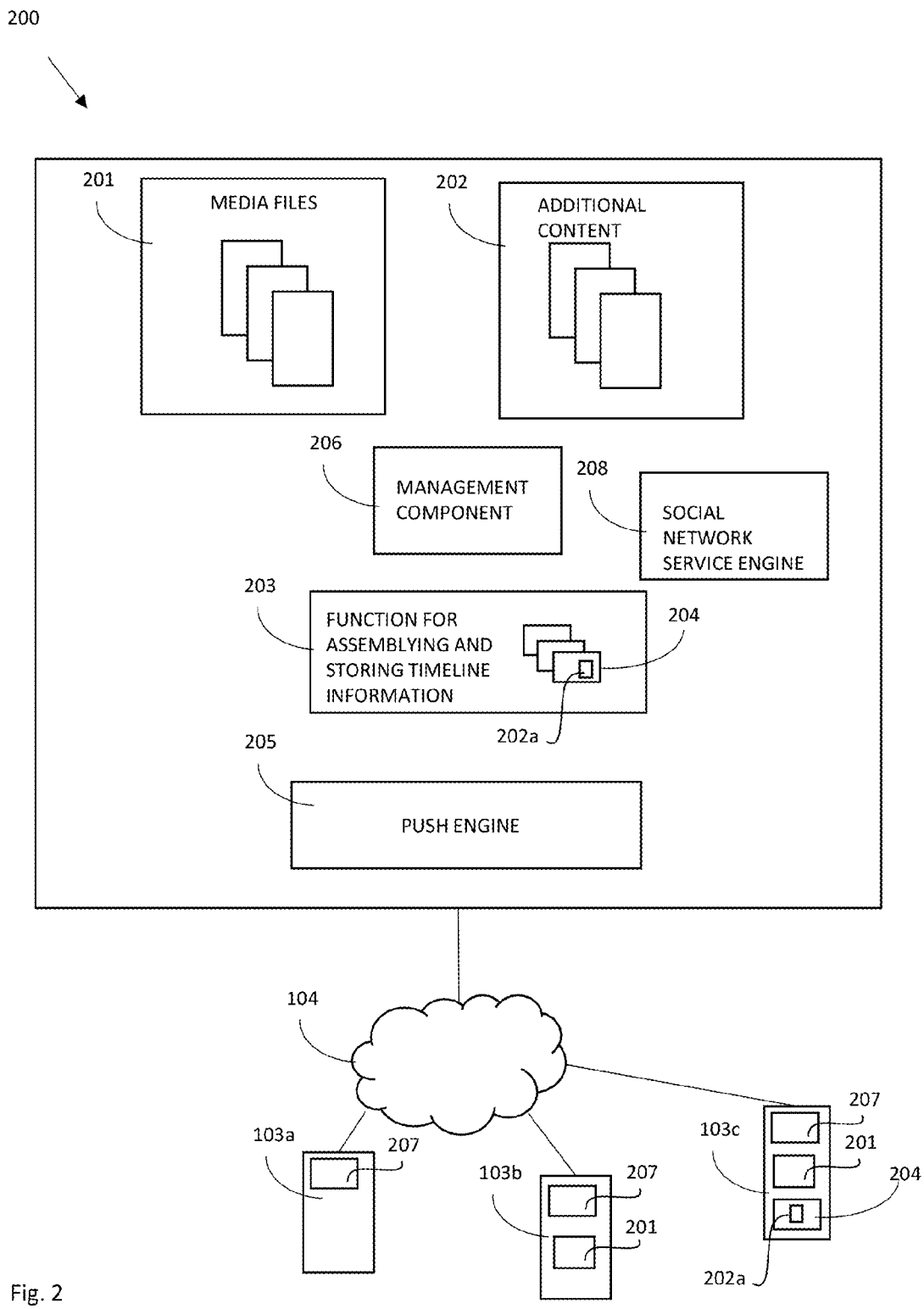
FIG. 2 is a schematic diagram illustrating an embodiment of a computer system according to the invention that can execute the method according to the first aspect of the invention.

The method according to the first aspect of the invention is implemented by a system 200, seen in FIG. 2 which is the second aspect of the invention. The system 200 may have all the necessary components for carrying out the method according to the first aspect of the invention. Suitably the system includes at least one server 101 from which the client device 103 can access files. The various components of system 200 can be distributed across several servers 101 and data stores 102. Thus when it is referred to "a server" or "the server" herein it may be two or more servers that cooperate. Thus for example, the timeline information 204 may be provided by one server and the additional content 202 may be stored on a different server 101 or data store 102.

A user may be able to user client device 103 to create additional content 202 or 202a, and such additional content becomes available to the devices 103 of other users as described below.

The device 103 preferably has stored, in its memory, at least one video or audio file in digital format 201 that can be experienced by the user. In one embodiment the audio or video file 201 does not have to be completely downloaded to client device 103 in order for client device 103 to play it. Thus it can be an audio file or video file that can be streamed from server 201. However, in a preferred embodiment the audio or video file 201 is completely downloaded to the client 103 before it is played as described below. This can preferably done using a Wi-Fi connection since such a connection provides a high bitrate at low cost.

The audio or video file 201 is usually referred to herein as the "media file". Preferably, the client device 103 can play the media file 201 when the client device 103 is offline, i.e. not connected to the network 104. Typically, the media file 201 can be downloaded by the client device 103 from server 101 of the system 200. For example, the client device 103 may subscribe to media files 201 published by server 101, for example through a RSS feed system.

The audio or video file 201 may be a files of a type commonly used to distribute audio or video in a digital format, which preferably features data compression requiring the client device 103 to process the file contents before display. Video files supported by the invention may include: 3pg, AVI, ASF, Matroska, MOV, MP4, NUT, Ogg, RealMedia, 3iv, Cinepak, DivX, DV, H.263/MPEG-4 aVC, HuffYUV, Indeo, MJPEG, MPEG-1, MPEG-2, RealVideo, Sorenson, Theora, WMV, XviD. Audio files supported by the invention may include: AAV, AC3, ALAC, AMR, FLAC, MP3, RealAudio, Shorten, Speex, Vorbis AAC, AAC-HE and WMA. The file size of the media file is usually larger than 2 MB, often larger than 10 MB.

The system 200 also includes additional content 202 in a digital format, stored on the server 101 or data store 102. The additional content 202 is presented to the user at time points as defined by time line information 204, which will be explained in detail further below. In general the timeline information 204 synchronizes the presentation of additional content 202 to the playing of the media file 201 such that additional content is presented to the user at the correct time points. The timeline information 204 is stored on the server 101, and can be accessed by the client device 103.

The additional content 202 enhances the experience of the user when the media file 201 is played. The additional content 202 may for example be user comments regarding the media file 201 from other users of the system 200 for example users of a social network service. As a further example, when the media file 201 is an audio file which is an interview with an actor, the additional content may be a photo of the actor which is displayed on the display of the client device, thus enhancing the experience of the audio file.

The additional content 202 may be in the form of digital files storing video, audio, image, text, a webpage, user comment or user rating. The additional content may for example include the audio and video file types mentioned above and file types in, for example, the following formats: jpg, .gif, .tif, .html, .pdf, .svg, .pnd, .flv and .swf. User ratings may for example be in the form of "like"/"dislike". User comments may include text, but the user may also have the opportunity to add user comments in the form of links to, for example, web pages, images, videos or audio available through network 104. The user may user the client device 103 to take photos, record audio or video and post as user comments.

The additional content 202 preferably has a data size that is rather small to allow the client device to access it on server 101 or data store 102 and quickly present it to the user even under poor bandwidth conditions. The additional content preferably is smaller than 10 megabytes (MB), more preferably less than 1 MB, more preferably less than 0.5 MB, more preferably less than 100 KB, more preferably less than 10 KB and most preferably less than 1 KB.

The additional content may be a text, for example a text string that is associated with the time point. The additional content as text 202a is accessed by client device 103 and updated as a part of time line information. The additional content as text may for example be comprised in a timeline file 204. In the case of text, the time point does not necessarily have to be associated with a link to another file. Instead the time line information itself may comprise the additional content 202 as text 202a, in particular when the time line information is in the form of a time line file.

The text 202a may define a user comment, or provide a text comment to other additional content 202. The text 202a may also define a command to the client device 103. For example, the command may cause the client device 103 to pause playing the media file 201 or to start playing the media file 201, or cause the client 103 device to jump to another time point of the timeline information, for example a time point associated with additional content 202. The command may cause the client device 103 to present the user of client device 103 with a possibility to enter input. The command may instruct client device 103 to for example pause or play media file 201 or jump to another time point depending on the thus made input from the user. In this manner the commands as text 202a may provider an interactive experience to the user. For example, the user may be prompted to answer a question. If the user inputs the correct answer, the client device 103 shows a certain part of media file 201 or certain additional content 202.

The additional content 202 may be provided by the provider of the media file 201, a publisher or by users of a social network service. The additional content 202 may be an advertisement.

The system 200 furthermore comprises a function 203 for assembling and storing a plurality of timeline information sets 204. Each time line information 204, for example a timeline file 204 may be associated with one media file 201. The timeline information 204 will be described below. In system 200 there may be plurality of media files 201 each media file being associated with one set of time line information 204.

The system may comprise a social network service engine 208 which provides a social network service to a number of users. Social networking services are previously known. Typically a social networking service allows users to set up accounts and to add content such as comments, photos, videos, ratings or other content (referred to as "posting"). The content then becomes available to other users of the social network service. Typically the content is available to a restricted class of users, for example users that actively subscribes to the account of the first user, or user that are approved by the first user. However, such a feature is not necessary. The content can also be made available of all users of the service. Thus the posted content simultaneously becomes available to a number of users. Typically the social networking service is accessed through an electronic client device. FACEBOOK, INSTAGRAM and TWITTER are examples of such social networking services. A social network service engine 208 may have functionalities for handling user accounts and handling social network connections between users.

A management component 206 comprises all the necessary features for the system: a user interface for managing the system, publishing (such as RSS publishing), databases, network interface and control, and components for receiving and publishing additional content. There may be a push engine 205 that communicates with device 103. The system may comprise a functionality for streaming media files 201 to client device 103. This functionality may be used when data bandwidth (data communication bitrate) allows it.

The client device 103 is preferably an electronic client device, such as a smart phone, a tablet computer a, laptop or a pair of smartglasses such as a pair of GOOGLE GLASSES. The client device 103 is able to play audio. Preferably the client device 103 can play video files and audio files. The client device 103 is preferably an electronic client device with at least one memory and at least one processor. The client device 103 also has the capability to carry out timing, preferably timing in seconds. For this purpose the client device 103 may have a timing processor.

Preferably the client device 103 also has a display, such as a LCD display which enables it to show images and video. The client device may have input devices such as a keyboard, a camera and a microphone. The camera may have video capturing capability.

Preferably the client device 103 has an interface 207, preferably a graphical user interface (GUI), which may be provided by a locally installed application or accessed from a remote source, such as via HTML5. In the instant example, the interface is provided by an app 207. The interface 207 of client device 103 at least allows the user to instruct client device 103 to access the timeline information 204. Preferably the app 207 is able to play the media file 201. The app 207 may have a graphic user interface, which may be controlled through a touch screen. The app 207 can suitably be downloaded and installed on the client device 103 by the user.

The user may be able to use the client device 103 to play audio or video files with the app 207 on the device 103 by giving commands by using the graphical user interface. The interface 207 may have commands for selecting audio and/or videos, playing, pausing, fast forwarding, muting and such. The interface 207 may also have functionality for subscribing to and downloading media files that are intermittently made available by a publisher, such as an RSS subscription functionality.

In FIG. 2, users of client devices 103a, 103b and 103c all have interface 207. Users of client devices 103b and 103c has downloaded media file 201. User 103c also has downloaded timeline information 204 with additional content as text 202a.

In addition, client devices may download and store additional content files 202 as described below.

The method of the first aspect of the invention will now be described with reference to FIG. 3. Here it is presumed that the client device 103 has already downloaded the media file 201 to the client device as can be seen in FIG. 2 (client device 103c). However, in an alternative embodiment the media filed 201 is streamed from server 101 to client device 103.

Figure 3:
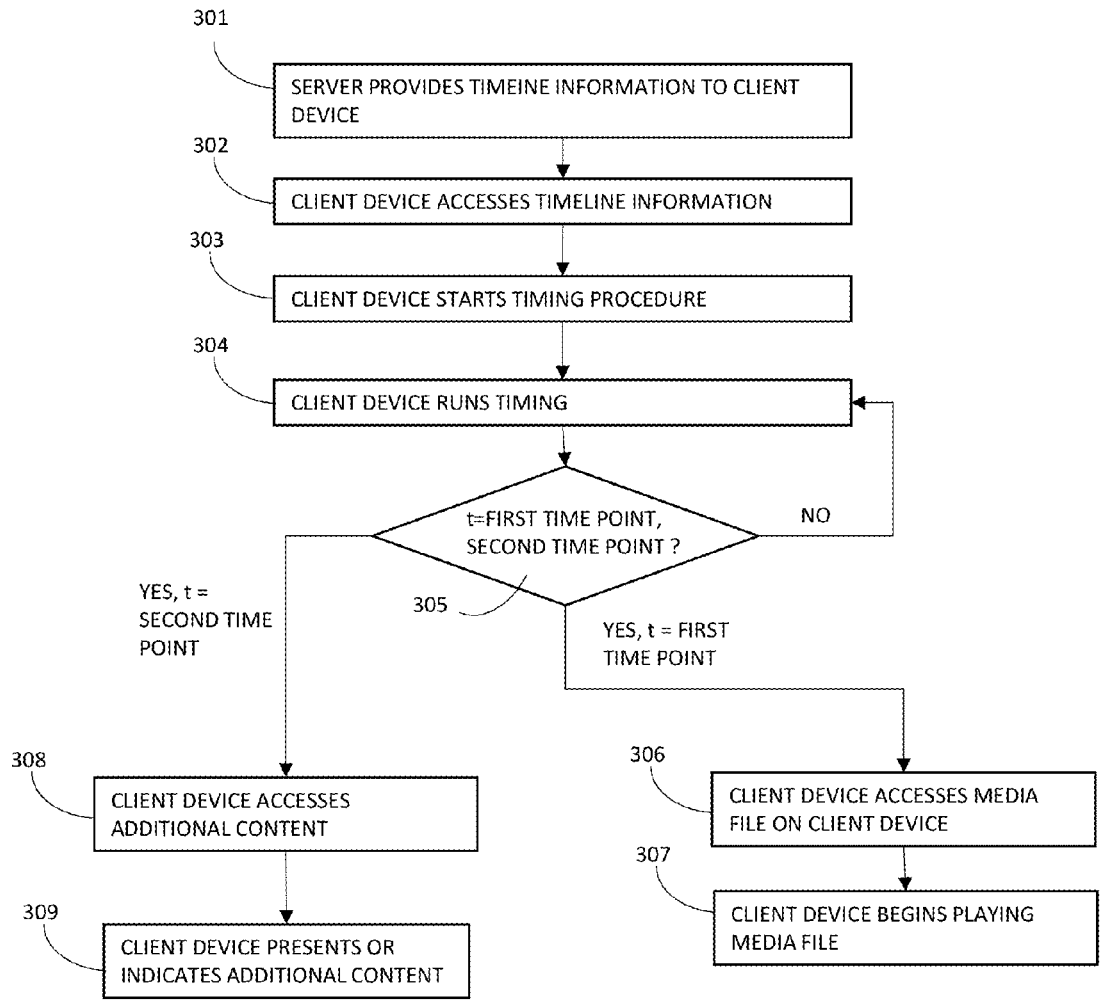
FIG. 3 is a flowchart illustrating an embodiment of a method according to the first aspect of the invention.

In step 301 of FIG. 3 the server provides timeline information 204. The timeline information 204 can be read by the client device 103 and may be described as a framework for measuring time relative to a starting time and comprising instructions to present various content files at predetermined time points, said time point being relative to the time for the client device accessing the timeline information.

The client device may download the timeline information 204 through network 104. In one embodiment the timeline information 204 is automatically downloaded to the client device 103 from server together with the media file 201 and stored on the client device 103 for later use. Thus, the first step of the method may be to download the media file and the time line information. Additional content 202 may also be downloaded and stored on device 103 for later use, as a backup feature. This is useful when the user wants to experience the media file 201 with additional content 202 while being offline.

The interface 207 is preferably arranged so that a user easily can select timeline information 204 for a certain media file 201 that the user wants to play. The timeline information 204 thus may have the name of the media file 201 stored as metacontent. This enables the client device 103 to display the name of the media file 201 to the user in the window 401 of interface 207. For example, if the name of the media file 201 is "Super Bowl 2014", this name is stored as metacontent and displayed to the user.

When the client device 103 accesses the timeline information 204 the client device 103 automatically starts a timing procedure in the client device 103. Conveniently, the time points of the timeline information 204 are determined in seconds and the timing is carried out in seconds.

The timeline information 204 comprises instructions to the client device 103 to play or show files or present the content of files in a certain order. The timeline information n 204 has information about at least two time points: a first time point which defines a time for the client device 103 to start to play the media file 201 and at least one time point (second time point) for presenting additional content 202. The first time point is, in a preferred embodiment, associated with a media file 201 stored on the client device 103 and the second time point is associated with a file 202 that comprises additional content. The first time point, may, however, alternatively be associated with an audio or video file that is stored on the server 201 and streamed from server 201 to the client device 103.

The time points are relative to the time point to when the client device 103 accessed the timeline information 204. Thus, the time points refer to a time, measured in for example seconds, from when the client device 103 accesses the timeline information 204.

For example the timeline information 204 may instruct the client device 103 to start playing a media file 201 at t=0 seconds, that is, immediately upon the client device 103 accessing the timeline information 204, and to show a user comment at t=3600 seconds.

The first time point of the time line information is associated with the media file 201. "Associated" refers to a logical connection between the time point and the file. The association may include a pointer or link. As used herein, a "pointer" refers to an association to a file stored on the same device, for example a file path to the file, such that the client device 103 can find the file that is locally stored on the client device 103 and play it or present it. A "link" refers to association to a file on a different computer. The link may be an address to a file on a different computer, for example a web address. The link may for example be a url address. When the media file 201 is streamed from server 101 the first time point is preferably associated with a link to the media file 201.

In one embodiment the media file starts playing immediately upon when the client device 103 accesses the timeline information.

The second time point is associated with a link to additional content 202 which is stored on a server 101 or a data store 102 or in an external location such as accessible via the Internet. The link enables the client device 103, when timing has reached the second time point, to access the additional content 202 on the server 101 or data store 102. The additional content 202 may be stored on a different server 101 or a data store 102 from the server 101 that provides the timeline information 204. Alternatively, when the additional content 202 is text, no link is needed because the additional content 202a is then comprised in the timeline information 204.

In one embodiment, as a backup, in case there is no network connection (i.e. connection to network 104) the device may access additional content 202 stored locally on the client device 103. This locally stored additional content 202 is preferably downloaded together with the media file 201 and time line file 204. Additional content that is in the form of text (202a) will also be available offline once the time line information 204 has been downloaded to the device. However, this locally stored additional content may be updated when the client device 103 once again establishes a connection to network 104. The timeline information 204 may have a pointer to additional content 202 stored locally on client device 103, as a backup in case the server 101 cannot be contacted to provide additional content 202, for example when device 103 does not have contact with the network 104.

There may be additional time points each associated with links to further additional content files 202. Thus there may be third, fourth, fifth and so on time points each associated with third, fourth and fifth files with additional content 202, each stored on a server 101 or data store 102. These time points may be referred to herein as "additional time points".

The additional content 202 may be a user comment or a user rating provided by a second user connected to system 200 for example in a social network service. Thus, in one embodiment the additional content 202 is generated or added to the timeline information 204 on the initiative of a user of the system 200 for a user of a social network service. In one embodiment there may be at least two users that are able to generate additional content 202 and at least two users that are able to use client device 103 to access that additional content 202.

Thus, the additional content 202 may be a user comment or a user rating provided by a user of a social network service of which the user is a member. For example, the media file 201 is a video file and a second user of the social network service has made a comment about a certain scene in the video. The comment will then be presented to the first user at the second time point. Preferably, the comment is additional content as text 202a which is stored as timeline information 204, for example in a time line file. This provides a convenient way to update the timeline information 204 in the device 103, even under low bandwidth conditions.

In step 302, the client device 103 accesses the timeline information stored on the client device 103. This is done when the user instructs the client device 103 to do so, for example by using the interface 207. Typically the user accesses the timeline information 204 when he or she wants to experience the media file 201. Preferably the interface 207 lists the name of media file 201. "Accessing" the timeline information refers to the client device 103 reading the timeline information 204 and executing any commands therein. This may include loading the timeline information into the RAM of the client device 103.

Preferably the client device 103, when connected to network 104, automatically connects to the server 101 when the timeline information is accessed so that the timeline information 204 stored in client device 103 can be updated. Additional content 202 stored on the client device 103 may then be updated too. Updating is carried out as described below.

In a preferred embodiment the media file 201 is first downloaded to the client device 103 in its entirety before the client device 103 accesses the timeline information 204, i.e. before the user, through client device 103, accesses the timeline information 204. Thus in this embodiment the media file 201 is completely downloaded to the client device 103 before the user, through client device 103, accesses the timeline information 204.

The timeline information 204 may, after being accessed by client device 103, be updated often to provide for updated additional content 202 to be provided at regular intervals. This is particularly useful when the additional content 202 is user comments or user ratings. For example, the client device 103 may access the server 101 at predetermined intervals to check for updates, for example every 10 seconds or every 60 seconds.

The time line information can be structured in different ways. The time line information may be in the form of a timeline file 204 that is downloaded by client 103 from server 101 and stored on the client device 103. The time line information 204 can be updated as described further below. The timeline file may comprise additional content as text 202a.

Accessing the timeline information 204 in step 302 also activates timing procedure in step 303 carried out by the client device 103, such that the client device 103 starts counting from time=0. The timing then runs continuously in step 304. Timing continues without interruption during steps 304 through 309. However, it the user fast-forwards or rewinds, the timing is adjusted accordingly. "t" in FIG. 3 indicates elapsed time from the time point when the client device 103 accesses the timeline information 204. An advantage with carrying out timing in the client device 103 rather than in the server 101 is that the client device 103 can keep track of the time even when the client device 103 is offline. Also, timing in the client device 103 rather than in server 101 minimizes network traffic. Also it may be complicated to arrange for multiple timing for a large number of client devices 103 in the server 101.

Preferably step 303 is carried out immediately after step 302 so that the user experiences that the steps are carried out simultaneously or almost simultaneously. Preferably step 307 is carried out immediately after step 306 so that the user experiences that the steps are carried out simultaneously or almost simultaneously. Preferably step 309 is carried out immediately after step 308 so that the user experiences that the steps are carried out simultaneously or almost simultaneously.

When the timing, in step 305 reaches the first time point, the client device accesses the media file 201 in step 306 and starts playing the media file 201 in step 307. The timeline information 204 has a pointer to the media file 201 in the client device 103 which is associated to the first time point. Alternatively, in the case of a streaming media file, there is a link to the media file on the server 101.

When timing in step 305 reaches the second time point, the client device 103 automatically accesses the additional content 202 in step 308 and presents the additional content 202 to the user in step 309, by following (accessing) the link associated with the second time point in the time line information. The client device 103 accesses the additional content from the server 101 or data store 102 or externally where it is stored. Thus the client device may establish a connection to the server 101 or data store 102 in step 308. The additional content 202 may be downloaded or streamed from the server 101 or data store 102 to client device 103. Alternatively, when the additional content 202 is a text command, the client device 103 may carry out the command.

When the additional content 202 is text, for example a user comment, the additional content may be stored in the timeline information 204 itself, as discussed above and a server need not be contacted in order to present the information, and step 308 does not involve contacting a server.

The presentation to the user may be done in different ways depending on the nature of the additional content 202.

When the additional content 202 is an image the image may be displayed on the display of the client device 103. The image may comprise a link to a web page that can be accessed by the user as described below.

Figure 4A:
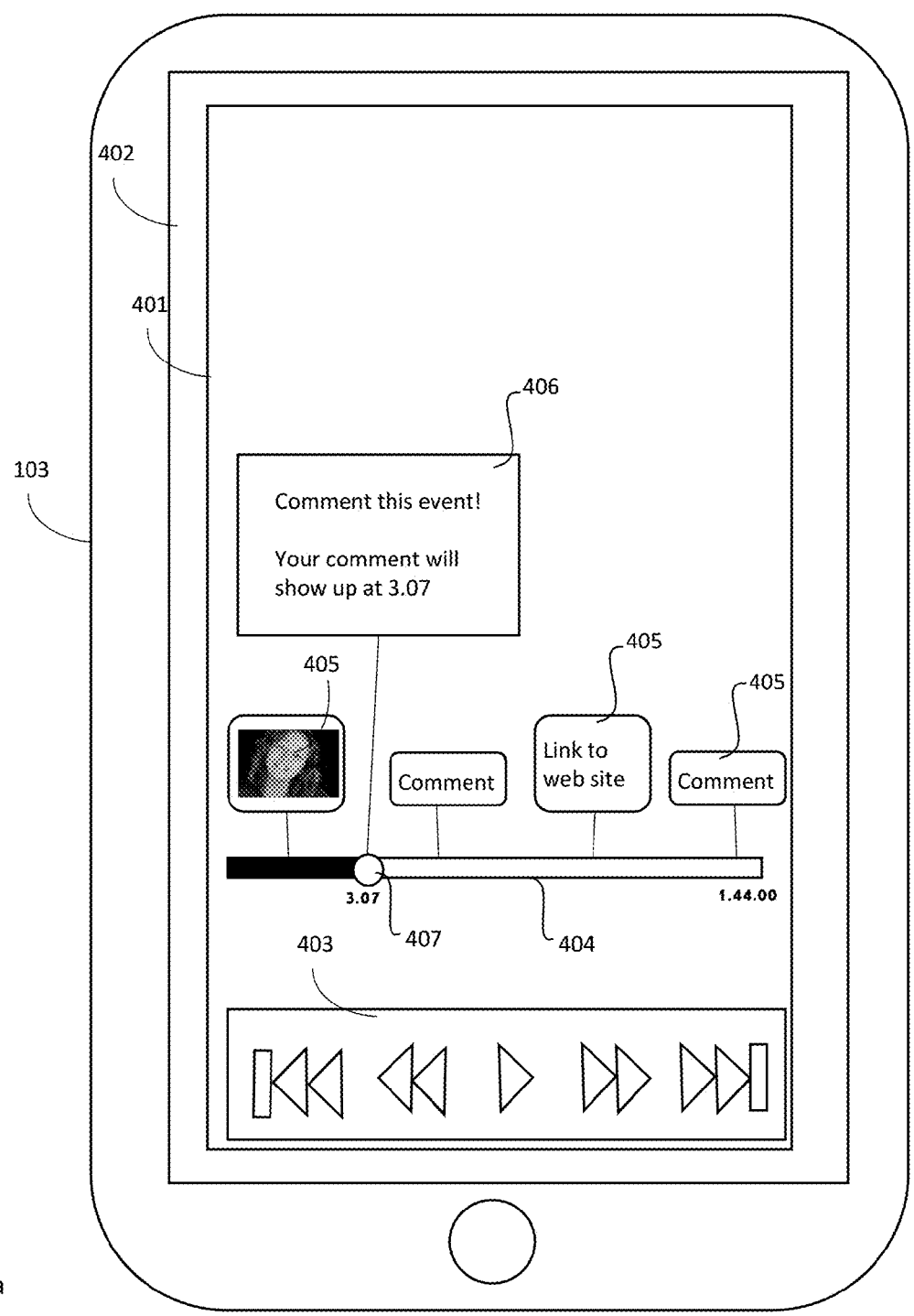
FIGS. 4a and 4b are schematic overviews of examples of visual timelines according to the invention.

When the additional content 202 is a web page, the web page may displayed to the user, either in a separate browser (for example SAFARI or CHROME) of the client device 103 or in a web browser functionality of the interface 207. Thus, the interface 207 may have a web browser window. When the additional content is a web page the web page may be accessed only after interaction by the user with the device 103, such as the user clicking on a link. The link may be embedded in an image that is presented to the user on the display 402 of the device 103 as shown in FIG. 4a. The user may access the web page by activating the link, which may, for example be displayed as text or be embedded in an image.

When the additional content 202 is a video it may be played in a window of the interface 207.

When the additional content 202 is audio it may be played in speakers of the client device 103 or through headphones connected to the client device 103.

When the additional content 202 is audio or video the playing of the media file 201 may be paused during the presentation of the additional content 202.

For other types of additional content 202, such as user comment, user rating, text, or image, or web page, the media file 201 may continue to play during presentation to the user of the additional content 202. Thus the playing of the media file 201 is not paused when the additional content 202 is presented to the user.

In particular when the media file 201 is an audio file, the audio file may continue to play while the client device 103 presents the additional content 202 to the user, when the additional content 202 is an image, a web page, a user comment or a user rating.

Additional content 202 in the form of user ratings or user comments in the form of text can be displayed on the display 402 of the client device 103. User comments may comprise text and/or media for example images, links to web pages, film clips, etc.

Figure 4B:
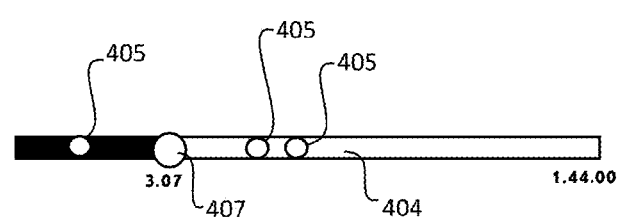

In one embodiment all of the additional content 202 is not presented to the user, but an indication 405 to the user that certain additional content 202 is available to the user, is instead presented to the user. The indication can be a visual indication 405 or a sound alert to the user. Preferably there is a visual indication 405 as shown in FIGS. 4a and 4b. This has the advantage of alerting the user of the fact that additional content 202 is available at that time point, without distracting the user from experiencing the media file 201 too much. For example, with reference to FIG. 4a an indication 405 that additional content 202 is associated with the time point may be altered to alert the user. For example the indication 405 may appear, change color or size, become highlighted or expanded, without presenting the full content, when the second time point is achieved. In the case when the media file 201 is an audio file, the user may be alerted to the fact that there is additional content 202 with an audio signal, for example a short tone or a beep, that occurs at the second time point or within +/−5 seconds of the second time point.

In one embodiment, when the additional content 202 is not presented but an indication is presented to the user as described above, the client device does not access the server to download the additional content 202 until the user interacts with device 103, for example touching an icon or link on the display. The device then downloads the additional content 202 and presents it to the user. This has the advantage of reducing data traffic.

According to the fifth aspect of the invention, which is directed to method for displaying a visual timeline, there does not need to be an indication and the additional content 202 is not automatically presented to the user.

The timing of steps 303-305 may run until end of a predetermined time. Thus, the timeline information may have duration. The duration is conveniently chosen to accommodate the combined playing time of the media file 201 and any additional material 202 that has a duration. The time line 204 file may have information about the end time point.

Although the first and second time points are referred to as such, the first time point may occur after the second time point. This will be the case when the additional content 202 is to be provided to the user before the media file 201 plays. For example, the second time point may provide for an advertisement to be presented to the user before the media file 201 plays. Thus steps 308 and 309 may be carried out before steps 306 and 307. Also, the first time point and the second time point may be the same time point, such that the additional content is presented to the user at the same time as the media file starts playing. For the sake of clarity it should also be noted that second time point often occurs during the duration of playing the media file 201.

The timeline information 204 may be continuously updated. Thus, the timeline information may be updated during the time that it is accessed by the client device 103. The timeline information 204 may be updated during when the timing is running. Preferably the timeline information is updated at least once after the client device has accessed the timeline information 204. Preferably the client device 103 attempts to contact server 101 and attempts to update timeline information 204 upon access. Thus, any new time points with associated links to additional content 202 (or additional content as text 202a) that are added when timing is running is automatically provided to and accessed by the client device 103. The client device then automatically updates any visual time line 404 with additional indications 405, and additional content 202 with time points occurring after the time that has elapsed will be presented to the user.

The timeline information 204 on client device 103 can be updated by being replaced with a new timeline information 204 from server 101. Thus, when the timeline information 204 is a timeline file 204 the timeline file 204 on the client device 103 is replaced with a new time line file 204. Alternatively, instructions to change the timeline information 204 (for example a time line file) on the client device 103 may be provided from server 101 to the client device 103. As a third alternative, the client device 101 may access a database on the server 101 in a dynamic manner in order to access the timeline information 204. Thus, the steps of the server 101 providing the timeline information 204 to the client device 103 and the client device 103 accessing the timeline information may be carried out simultaneously.

In a preferred embodiment, push technology is used to speed up delivery of updates to the client device. Conventional pull technologies sends information from a server to a client upon request from the client. Typically this is done at a certain predetermined time intervals. Push technologies, on the other hand, updates a file upon the initiative of the server. The same push technologies used for updating web pages can be used, for example for updating stock tickers and online chat/messaging systems. Firebase™ is an example of a useful push technology. System 200 may comprise a push engine 205 that communicates with device 103. System 200 may, for example, communicate with client device 103 with the user of a network socket. The timeline information 204 can be continuously accessible for the client device 103 on the server 101. The timeline information may be updated upon the initiative of the server 101. The advantage of using a push technology is that the client device 101 does not have to ask the server 101 for updates. Pull requests to the server often results in no updates, which causes in unnecessary net traffic and waste of processing power.

Several client devices 103 can be simultaneously connected to the server 101, each receiving updates of the timeline information 204 and measuring time from when each particular client device 103 accessed the timeline information. Timing is carried out relative to when each client device 103 accessed the timeline information. Thus timing is thus not relative the starting time or duration of any media file. Each or some of such client devices 103 may be connected to a social network service, for example, with the use of social network service engine 208.

Figure 7:
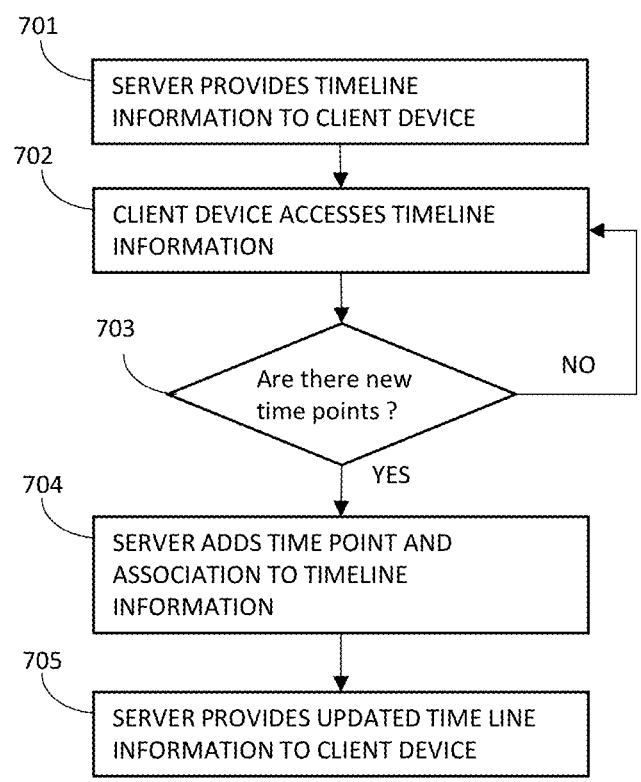
FIG. 7 is a flowchart illustrating a method for updating timeline information.

FIG. 7 shows how the timeline information can be updated. In step 701 the server 101 provides the timeline information to the client device 103. In step 702 the client device 103 accesses the timeline information 204 and timing starts. The system 200 then checks if any new time points are added in step 703, for example, if a user of a social network service adds a new comment. The time point with the associated link is then added to the timeline information in step 704 by the system 200, and the updated timeline information is provided to the client device 103 in step 705. In this manner the timeline information 204 on the client device 103 is only updated when there are new time points are available. Thus, the client device 103 does not have to ask the server 101 if there are any updates.

With reference to FIG. 4a the interface 207 of the device may be an app 207 running on, for example, a smart phone or a tablet computer. The interface 207 preferably provides a window 401 on the display 402 of the client 103. Preferably the display 402 is a touch screen. The interface 207 may provide the user with the possibility to enter various commands, for example for selecting and playing media files 201 as described below.

Preferably the window 401 has buttons 403 with which the user can control the playing of the media file 201, such as commands for fast forwarding, pausing and muting. It should be noted that pausing may stop the timing of step 302 and simultaneously pausing the playing of the media file 201. Likewise, fast forwarding fast-forwards timing of step 302 as well as the media file 201 to the same extent.

In one embodiment the window 401 has a visual timeline 404 that indicates that additional content 202 is available. The visual time line 404 is preferably continuously displayed to the user when timing is running Such indications 405 for additional content 202 may indicate the type of additional content 202, for example if it a user comment, an image or other type of additional content 202. However, the indications 405 may be less conspicuous than in 4a, as shown in FIG. 4b. Preferably the position of the indication 405 along the visual time line 404 is determined by the time point of the additional information 202 in the time line information 204. Preferably, the position of the indications 405 along the visual timeline 404 is determined by the relationship of the time point to the duration of the timeline information. For example if the duration of the time line is 30 minutes and the time point is 15 minutes, the indication 405 is located in the middle of the visual time line 404 ("middle" of the visual timeline 404 being between the left and right endpoints of the visual timeline 404 of FIGS. 4a and 4b).

There may be a progress indication 407 which shows how far the playing of the time line information 204 has progressed. There may also be a window 406 that prompts the user to add a comment or make a user rating, which then becomes available through a social networking service. Such a window 406 may also be used by the user for adding other types of additional content 202 for example links to webpages, or for uploading images so that such material becomes additional content 202 available to other users of the social networking service.

Preferably the user can access the additional content 202 by fast-forwarding to the indication 405 or by tapping the indication 405 when the device has touch screen, alternatively selecting the indication 405 with a cursor and mouse when provided by the device 103. Preferably the visual timeline 404 is continuously updated such that indications 405 of any newly added additional content 202, such as for example user comments, appears on the visual time 404 line in real time, or almost real time Updating of the visual time line 404 is suitably carried out immediately after the time line information 204 has been updated. The updating of the visual time line 404 may be triggered by updating the time line information 204.

When the user wants to play a media file 201 he or she instructs the client device 103 to access the timeline information 204 for that media file 201 as described below. This may be done, for example, by tapping an icon in the window 401 of the app 207 of the client device 103. The client device 103 then accesses the timeline information 204.

The user may add user comments or ratings to the timeline information 204 in different manners with the aid of interface 207. In one embodiment, user comments or ratings may be automatically associated with the time point at which the user starts to make input, for example when the user starts writing a comment in a window 406 for that purpose. In one embodiment the user can select the time point for the user comment or user rating, for example by moving the indicator 407.

In one embodiment the device 103 is able to record sound. The user may control the sound recording with the aid of app 207. The sound recording may start immediately when the user starts the app 207. This has the advantage that recording starts faster than if the uses also has to press a "rec" button. Thereby, the user records as much as possible of the ongoing sound. In one embodiment the sound recording is automatically saved and posted as additional content 202 with just one additional action by the user, for example one tap on a button in the window 401 of the interface 207. The posting is then by default associated with a time point when the recording is initiated. Alternatively, the posting is associated with the time point when the posting takes place. Playing of the media file 201 may be automatically paused during recording. In one embodiment, the recording can, automatically or at the choice of the user making the recording, be made into a media file 201 with its own associated timing information 204, available to other users of a social network service.

Figure 8:
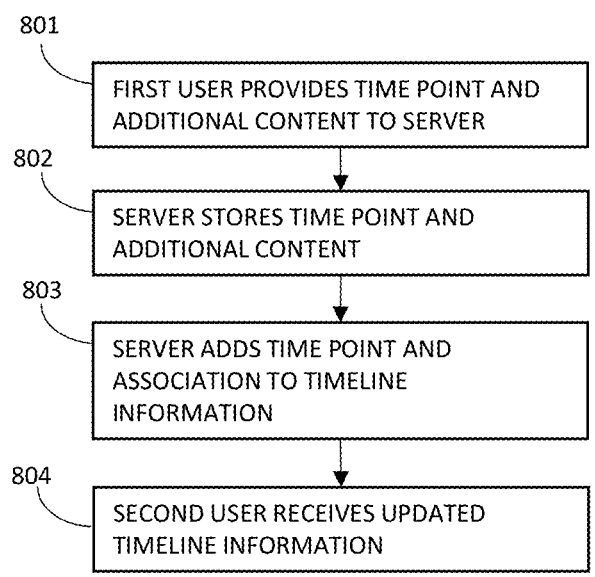
FIG. 8 is a flowchart illustrating a method for adding time points to timeline information.

FIG. 8 is a flowchart that shows how users of a social network service can add time points to the timeline information 204, where the time points are associated with additional content 202. The time point may preferably be related to a certain time point in media file 201, to ensure that the additional content 202 is presented to other users at the correct time point in media file 201. In step 801 a first user wants to add additional content 202 at a certain time point to make it available to other users of a social network service or other users of system 200. For example, the first user may want to comment a certain scene in a video. The first user uses interface 207 of client device 103 to select the time point and to input the additional content, which may be of any kind of the additional content 202 as described above, for example a comment, or a photo, or a user rating. The time point may be automatically determined by the client device 103 as indicated above. The client device 103 then provides the time point and the additional content 202 to the server 101. The server 101 then in step 802 stores the additional content in a memory. In step 803 the server adds the time point and a link to the additional content 202 to the timeline information 204, unless the additional content is text 202a in which case the additional content 202a is included in the timeline information 204. The server 101 may apply certain decision rules before publishing the timeline information 204 to client devices 103. For example, the server may make the additional content 202 available to a restricted group of users. In step 804 the client device 103 of a second user receives the update, and stores information about the new time point in its memory. There may be at least two users that are able to add additional content to the timing information. There may be at least two users that are able to receive updated timing information.

In one embodiment the additional content 202 is selected by system 200 based on a parameter, in particular when the additional content is an ad. The selection in system 200 is carried out by server 201. For example the parameter for selecting additional content 202 may be measured by device 103 or system 200 provided by user. The parameter for selecting additional content 202 may be one or more of user location, weather, the time of day, user profile (gender, age, household members, or previous user behavior).

The client device 103 may have a functionality for downloading media files 201. For example, the user may use app 207 of device 103 to instruct client device 103 to download a media file 201 from server 101. The client device 103 may present to user through app 207 a selection of media files 201 that are available on server 101. For example, the user may view a list of available media files 201 in the window 401 of the interface 207. Media files 201 may also be subscribed to via for example a RSS system. For example the media file 201 can be an audio podcast in MP3 format or similar audio format that the user subscribes to such that audio files 201 are automatically downloaded and stored on the client device 103 for later use. The timeline information 204 may be downloaded together with the media file 201 and stored on the device 103. When the user wants to experience a particular media file he or she may use the interface 207 to select the timeline file that is associated with that media file 201. The client device 103 then automatically accesses the timeline information 204 associated with that particular media file 201. The interface 207 may be adapted to read a name of the media filed stored as a part of the timeline information and display the name in the window 401. Hence, the user may not actually choose to experience a particular media file but actually choose a certain timeline information (timeline file).

Let say that the media file 201 is an MP3 file which is interview with an actress, stored in the memory of the client device 103 and that the first time point is set to 0 seconds in the timeline information 204. Therefore when the client device accesses the timeline information 204 the client device 103 immediately accesses the locally stored MP3 file and the interview starts to play immediately. The timeline information has a second time point at 10 seconds associated with a photo of the actress. Therefore, at 10 seconds into the interview, the device follows the link to the server and downloads the image file and shows the image on the display of the client device. Table 1 shows the information of the timeline information.

TABLE 1

| First time point | 0.00.00 | MP3 file, audio file |
|---|---|---|
| Second time point | 0.00.10 | Image file |

In a second example the time line information of Table 1 is updated with a third time point that provides a user comment that will be presented at 40 seconds into playing the MP3 file. The timeline information is shown in Table 2.

TABLE 2

| First time point | 0.00.00 | MP3 file, audio podcast |
|---|---|---|
| Second time point | 0.00.10 | Image file |
| Third time point | 0.00.40 | Text, user comment |

In a third example, there is a video advertisement which is 50 seconds long that plays before a video show which is 5 minutes long. In addition there is a user comment at 1 min into the video shown and an end point for the timeline information. Table 3 shows the timeline information:

TABLE 3

| First time point | 0.00.50 | Media file, video show |
|---|---|---|
| Second time point | 0.00.00 | Video file, ad |
| Third time point | 0.01.50 | Text/user comment |
| End point | 0.05.50 | End point |

In the example of Table 3 the user comments is presented to the user 1 minute into the media file, and 1 min 50 seconds after the user accesses the timeline information.

In the following is a example of JSON code that provides timeline information for two time points, one at 0 seconds for playing the MP3 file file.mp3 and one at 5 seconds for displaying the image file image.png. As is evident from this example, the timeline information does not require much storage space or bandwidth.

```
{
    "guid": "f35334c1-405b-4e83-9657-e17964314be8",
    "publishingDate": "2014-02-27T16:02:07.665Z",
    "channelName": "Johnnys Kanals Total",
    "description": "I detta avsnitt gör vi inte direkt något vettigt.",
    "name": "no 1",
    "images": {
        "original": "https://url/to/file.jpg",
        "size298x298": "https://url/to/file_298x298.png",
```

-continued

```
        "size40x40":
        + more sizes
        .
        .
        .
    },
    "popularity": 345,
    "url": "channels/channelname/acasts/episodename",
    "tags": [ ],
    "timeline": [
        {
            "description": "My description of this content",
            "duration": 3600,
            "guid": "5027b45e-bbf6-473f-9d45-f4375caa6c1c",
            "media": [
                {
                    "url": "https://url/to/file.mp3"
                }
            ],
            "start": 0,
            "thumbnail": {
                "original": "https://url/to/file.png"
            },
            "type": "audio"
        },
        {
            "description": "Description of second timeline object"
            "duration": 3,
            "guid": "d5316a1a-909e-47ea-b03c-8d9620a8ad1c",
            "media": [
                {
                    "url":
"https://acastsystemtest.blob.core.windows.net/media/channels/
johnnyskanalstotal/acasts/no1/timeline/
d5316a1a-909e-47ea-b03c-8d9620a8ad1c/
sourceMedia/filip_o_fredrik.png"
                }
            ],
            "start": 5,
            "thumbnail": {
                "original":
"https://acastsystemtest.blob.core.windows.net/media/channels/
johnnyskanalstotal/acasts/no1/timeline/
d5316a1a-909e-47ea-b03c-8d9620a8ad1c/
thumbnail/filip_o_fredrik.png"
            },
            "type": "image"
        },
    ],
    "type": "acast"
}
```

In a third and a fourth aspect of the invention, it is provided a method and a system for displaying a visual timeline. This method provides a visual timeline 404 which enables users of a social networking service to add user generated content 601 to a visual timeline 404 that can be viewed on the display 402 of a client device 103 by other users. The method can be used for example to provide a "second screen" experience. The main difference between this aspect of the invention and the first aspect of the invention is that that there is no media file 201 and that the additional content 202 is always user generated content 601. Otherwise, the system and the methods and the nature of the content are essentially the same. Thus the description above applies to these third and fourth aspects of the invention as well. "additional time point" is any time point more than the first time point, such as a second or third time point, in the aspects of the invention described below.

The method for displaying visual time line 404 may be used as follows. One user may, for example, access a visual timeline 404 and add a comment about a certain actor in a certain scene of a movie. The comment will be associated with a time point from the start time of the visual time line 404. This information is stored in the timeline information

204. A second user who watches the same movie the following day may, with a client device 103, access the timeline information 204. The second user will then be presented with the comments made by the first user at the same time points, relative to when the second user accesses the timeline information 204. Preferably the second user accesses the timeline information 204 at the same time as he or she begins to watch the movie, because then the user generated content will be presented at the correct time points in relation to the movie. The user may for example pause and/or fast forward the visual timeline to fine tune the synchronization of the visual timeline with the media being experienced.

The visual timeline 404 may, for example, relate user generated content 601 to movies, theatre plays, streaming video or audio media, or pieces of recorded music. The time point in the timeline information 204 is associated with text, a link or a pointer to a file comprising user generated content 601. The link or the pointer enables the client device 103 to access a file comprising user generated content 601. Preferably the time point is associated with a link to a file comprising user generated content 601 on a server 101. When the user generation content 601 is text it may be provided in the timeline information itself as text 601a, in the same way as for additional content 202a, described above.

In a preferred embodiment a user may, through interface 207 of client device 103, give instructions to the server 101 to create new time line information, for example a time line file, thus creating a new visual time line 404. The new visual time line 404, or the possibility to view the visual time line 404, will be provided to at least one, preferably at least two, other user of the social network service. For example, "friends" of the user thus creating the visual time line may be provided with an indication that a new time line is available from system 600. Alternatively, the user creating the new visual time line 404 may, by using client device 103, tag the new timeline with at least one searchable tag, and other users may be provided with the possibility to search for the tag by using their client devices. For example, a user creating a visual time line with comments to a video of the 2014 OSCAR AWARDS may tag the timeline information #oscars2014. These functionalities may be provided by system 600.

Figure 5:
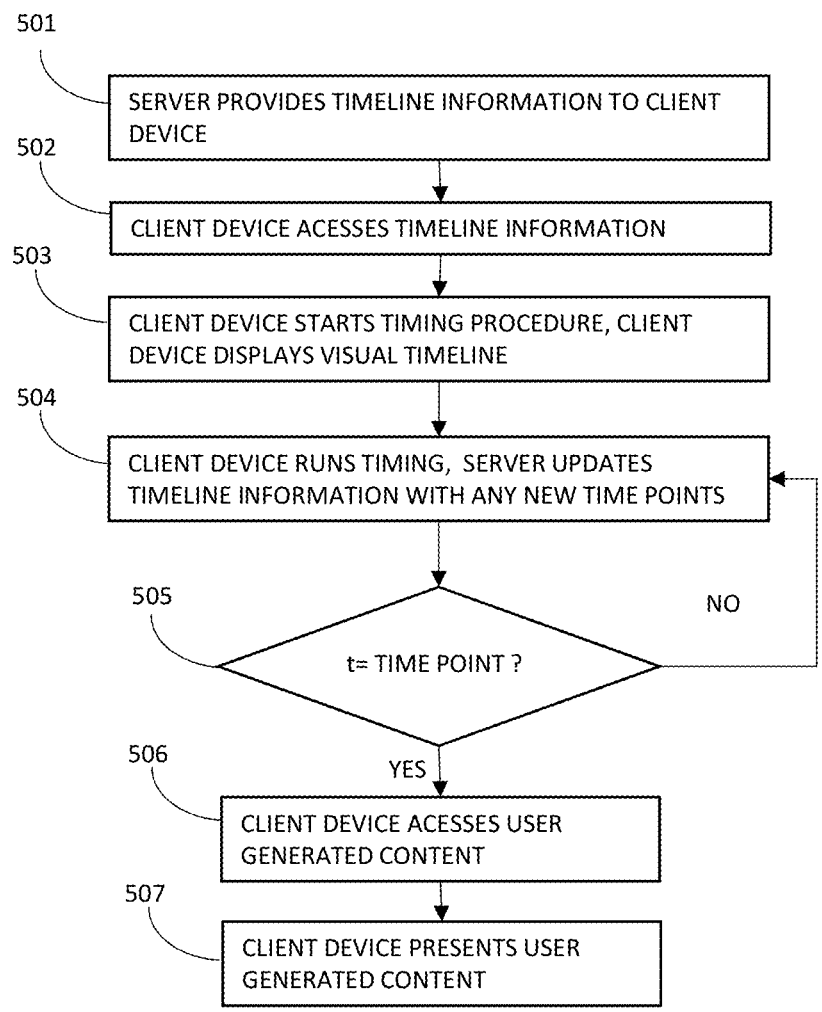
FIG. 5 is a flowchart illustrating an embodiment of a method according to the third aspect of the invention.

The method will now be described with reference to FIG. 5. In step 501, a server 101 provides timeline information 204 to the client device 103, the timeline information 103 comprising at least one time point relative to when a user, via interface 207 provided by a client device 103, accesses the timeline information. The time point is associated with text, a link or a pointer to a file comprising user generated content 601, the user generated content comprising digital video, audio, image, text, a webpage, user comment or user rating, said links or pointers added to the timeline information by users of a social networking service. "user generated" does not mean that the user necessarily has had to have made the video, audio, or image or text. Instead, "user generated" refers to content that a user has associated with the timeline information 204. The user generated content 601 preferably has a size that is rather small to allow the client device to access it on server 101 or data store 102 and quickly present it to the user even under poor bandwidth conditions. The additional content file or object therefore preferably is smaller than 10 megabytes (MB), more preferably less than 1 MB, more preferably less than 0.5 MB, more preferably less than 100 KB, more preferably less than 10 KB and most preferably less than 1 KB.

The client device 103 may download the timeline information 204 from the server 101 in advance for later use when the client device is offline, trough network 104.

In step 502 the user, via interface 207 provided by client device 103, accesses the timeline information stored on the client device 204. Preferably the client device 103 attempts to contact server 101 and attempts to update timeline information 204 upon access.

In step 503, the client device automatically starts a timing procedure in client device 103. Timing is carried out by the client device 103 as described for the first aspect of the invention. The client device 103 also displays a visual timeline 404 is in window 401 of the interface 207 of the client device 103. Such a timeline 404 may have the same features as the visual time line 404 in the first aspect of the invention which is shown in FIGS. 4a and 4b. The visual timeline 404 has visual indications 405 indicating where on the visual timeline 404 user generated content is available.

The timing may then proceed in step 504 until an end time point defined in the timeline information 204 is reached. Thus the timeline information 204 may have a predetermined duration. During timing, the timeline information 204 is continuously updated with any new additional user generated content 601 provided that client device 103 is online. Update can be carried out as described above and in FIG. 7. The visual timeline 404 on the display 402 of the client 103 is also updated, such that new indications 405 appears on appropriate places on the time line 404 when other users adds user generated content 601 to the time line.

When the time point is reached the client device 103 accesses the user generated content 601, for example by accessing a link to a file 601 on a the server 101, the file 601 comprising user generated content 601. This is shown in step 505 and 506. Timeline information 204 and user generated content 601 may be stored on different servers. The user generated content 601 is then presented to the user in step 507. This can be done in various ways depending on the character of the user generated content 601, as discussed for additional content 202 above.

Preferably step 503 is carried out immediately after step 502 so that the user experiences that the steps are carried out simultaneously or almost simultaneously. Preferably step 507 is carried out immediately after step 506 so that the user experiences that the steps are carried out simultaneously or almost simultaneously.

The client device 103 may via an interface 207, continuously offer a first user the possibility to add the first users' own user generated content 601 to the visual timeline 404 so that such content becomes available to other users through the social networking service. User generated content can be created and added to the timeline information 204 with the use of interface 207 as described above for additional content 202 in FIG. 8. For example, the user may take photo or make a video with the use of a camera of client device 103, or write a text comment, and post as user generated content 601. Such added material also becomes associated to a time point (second time point) relative the time point for accessing the timeline information 204. Thus, when a second user accesses the timeline information 204, the user generated content 601 is presented after a time relative the time the second user accesses the timeline information 204. In one embodiment there may be at least two users that are able to generate additional content 202 and at least two users that are able to use client device 103 to access that additional content 202.

In a preferred embodiment push technology is used to update the timeline information 204, as described above. Thus, the timeline information 204 may be updated upon the initiative of the server 101. The timeline information 204 may be continuously accessible on the server 101 for the client device 103.

Several client devices 103 can be simultaneously connected to the server, each receiving updates of the timeline information 204 and measuring time from when each particular client device 103 accessed the timeline information 204. Timing is carried out relative to when each client device 103 accessed the timeline information.

Figure 6:
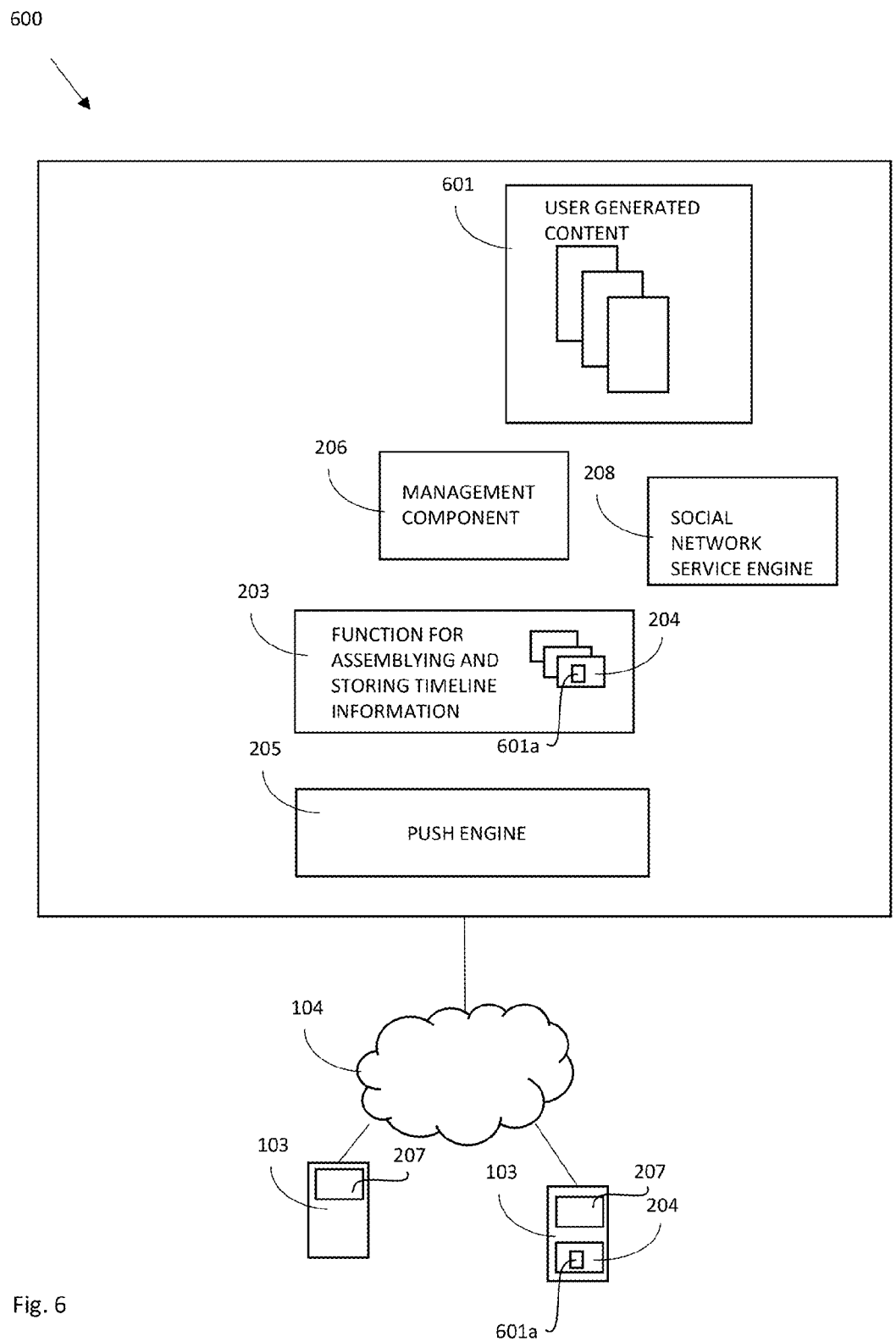
FIG. 6 is a schematic diagram illustrating an embodiment of a computer system according to the invention that can execute the method according to the third aspect of the invention.

In a fourth aspect of the invention there is provided a system for carrying out the method according to the third aspect of the invention. Such a system 600 is seen in FIG. 6. The system 600 is similar to system 200. The main difference is that there is no media file 201 in system 600, and that system 600 comprises user generated content 601.

The methods according to the invention are intended to be carried out in a computing environment 100 by a systems 200 and 600. The methods of the invention may be implemented by any suitable programming language.

While the invention has been described with reference to specific exemplary embodiments, the description is in general only intended to illustrate the inventive concept and should not be taken as limiting the scope of the invention. The invention is generally defined by the claims.

The invention claimed is:

1. A method for presenting digitally stored information to a user, comprising the steps of:
   a) providing, from a server to a client device, access to a timeline file comprising timeline information, the timeline information comprising a duration and instructions to the client device to present content in a predetermined order during the duration, the timeline information further comprising first and second time points, each time point being relative to when a user accesses the timeline file through an interface provided by the client device, and wherein the first time point being associated with an instruction to access a media file separate from the timeline file, the media file being a digital audio or digital video file stored on the client device, the second time point being associated with an instruction to access additional content, the additional content being either i) text comprised in the timeline file or ii) a file stored on a server comprising image or text in a digital format, or a webpage,
   b) receiving user input, through an interface provided by the client device, that accesses the timeline file, the accessing the timeline file starting a timing procedure that is not measured relative to a starting time or duration of the media file and additional content,
   c) the client device automatically starting playing the media file when the timing procedure reaches a time corresponding to the first time point of the timeline information,
   d) the client device, when the timing procedure reaches a time corresponding to the second time point of the timeline information, automatically presenting, to the user, the additional content or presenting, to the user, an indication that additional content is available,
   wherein steps c) and d) are performed in a chronological order dependent on an order of the first and second time points in the timeline information;
   wherein the duration accommodates the combined playing time of the media file and any of the additional content that has a duration;
   wherein the time line information is updated with an additional time point associated with an instruction to access further additional content after step b) has been performed and, in response to the update, the client device presenting the further additional content to the user when the timing procedure reaches the additional time point;
   wherein the additional time point associated with an instruction to access further additional material is added to the timeline information by a second user with the use of a second client device; and
   wherein the addition of the additional time point is carried out by, in a first step, providing, from the second client device to the server, information about a time point relative to a time point in the media file and further additional content, then, in a second step, the server storing the information about the time point and the additional content, then in a third step, the server updating the timeline information with information about the additional time point and the further additional content to make the additional time point and the further additional content available to the client device.

2. The method according to claim 1 where the additional content is an image file stored on a server.

3. The method according to claim 1 where the additional content is a web page stored on a server.

4. The method according to claim 1 wherein the additional content is presented or indicated to the user while the media file is played.

5. The method according to claim 1 where the additional content is text comprised in the time line information.

6. The method according to claim 1 where the additional content has been generated by a second user using a second client device.

7. The method according to claim 1 where the media file is an audio file.

8. The method according to claim 1 where the timeline information in the client device is updated upon the initiative of the server.

9. The method of claim 1 comprising the step of indicating on a visual timeline on a display of the client device that additional content is available, the visual timeline having a duration matching the duration of the timeline information.

10. The method of claim 1, wherein the timeline information further comprises a reference to access the media file at a file storage location of the media file.

11. A client device system comprising a processor and a memory having stored thereon instructions which, when executed by the processor, cause the client device to:
   a) establish an operative connection to a server to access a timeline file comprising timeline information, the timeline information comprising a duration and instructions to the client device to present content in a predetermined order during the duration, the timeline information further comprising first and second time points, each time point being relative to when a user accesses the timeline file through an interface provided by the client device, and wherein the first time point being associated with an instruction to access a media file separate from the timeline file, the media file being a digital audio or digital video file stored on the client device, the second time point being associated with an instruction to access additional content, the additional content being either i) text comprised in the timeline file or ii) a file stored on a server comprising image or text in a digital format, or a webpage,
   b) receive user input, through an interface of the client device, that accesses the timeline file, the accessing the timeline file starting a timing procedure that is not measured relative to a starting time or duration of the media file and additional content, c) automatically start to play the media file when the timing procedure reaches a time corresponding to the first time point of the timeline information, d) when the timing procedure reaches a time corresponding to the second time point of the timeline information, automatically present, to the user, the additional content or presenting, to the user, an indication that additional content is available, wherein c) and d) are performed in a chronological order dependent on an order of the first and second time points in the timeline information;

wherein the duration accommodates the combined playing time of the media file and any of the additional content that has a duration;

wherein the time line information is updated with an additional time point associated with an instruction to access further additional content after b) occurs and, in response to the update, the client device presenting the further additional content to the user when the timing procedure reaches the additional time point;

wherein the additional time point associated with an instruction to access further additional material is added to the timeline information by a second user with the use of a second client device; and wherein the addition of the additional time point is carried out by provision, from the second client device to the server, information about a time point relative to a time point in the media file and further additional content, then the server storing the information about the time point and the additional content, then the server updating the timeline information with information about the additional time point and the further additional content to make the additional time point and the further additional content available to the client device.

12. The client device system according to claim 11, wherein the client device displays a visual timeline on a display of the client device showing that additional content is available, the visual timeline having a duration matching the duration of the timeline information.

13. The client device system according to claim 11, wherein the timeline information further comprises a reference to access the media file at a file storage location of the media file.

* * * * *